United States Patent [19]
Wirfelt

[11] 3,786,545
[45] Jan. 22, 1974

[54] MILLING CUTTER
[75] Inventor: Sven Axel Olof Wirfelt, Sandviken, Sweden
[73] Assignee: Sandvik Akitebolag, Sandviken, Sweden
[22] Filed: Nov. 20, 1972
[21] Appl. No.: 307,765

[30] Foreign Application Priority Data
Nov. 29, 1971 Sweden............................ 015234

[52] U.S. Cl.............. 29/105 R, 29/103 A, 29/105 A
[51] Int. Cl................................................... B26d 1/12
[58] Field of Search.... 29/105 R, 105 A, 103 A, 95, 29/96

[56] References Cited
UNITED STATES PATENTS
| | | | |
|---|---|---|---|
| 2,805,469 | 9/1957 | Greenleaf | 29/105 A |
| 3,091,138 | 5/1963 | Berry | 29/105 A |

FOREIGN PATENTS OR APPLICATIONS
| | | | |
|---|---|---|---|
| 1,151,923 | 8/1957 | France | 29/105 A |

*Primary Examiner*—Leonidas Vlachos
*Attorney, Agent, or Firm*—Pierce, Scheffler & Parker

[57] ABSTRACT

In a milling cutter comprising a cutter body having a plurality of cutting insert-receiving recesses spaced about its periphery and cutting inserts removably secured in said recesses by clamping means, each insert having two opposite, substantially plane, end surfaces with side surfaces between them, the improvement wherein the side edges of each cutting insert are formed with clearance angles $\beta$ equal to one-half that clearance angle $\alpha$ which is necessary for the functioning of the milling cutter. Each insert is positioned, in its recess, with one side edge resting against a support surface that is planetarily ground in the cutter body substantially parallel to its rotational plane so that the angle which one end surface presents to said planetarily ground support surface is equal to $90°-(\alpha/2)$.

4 Claims, 5 Drawing Figures

MILLING CUTTER

This invention relates to a milling cutter of the type comprising a cutter body provided with a plurality of recesses, spaced around its periphery, adapted to receive removably placed inserts, each insert having two opposite, substantially plane, end surfaces and side edges between them, said inserts being mechanically clamped in their recesses in the cutter body. The invention also relates to a method of arranging inserts of said type in the cutter body.

Due to the relatively high cost, per cutting edge, of milling, there is a continuously increasing use of milling cutters having throw-away inserts mechanically clamped therein. When the requirements concerning the surface finish attainable therewith are moderate there are good technical solutions reached as regards the design problems connected with the use of such throw-away cutting inserts. If, on the other hand, there is a demand for a very high quality surface finish to be attainable therewith, the use of such throw-away cutting inserts will give rise to considerable problems. The reason for this is the difficulties concerning the accurate location of the inserts in the axial direction of the cutter body.

One of the major problems is to form location members in the cutter body so that they correspond to those location members which are used in the grinding of the cutting insert. For example, due to the inclination of the inserts in relation to the rotary plane of the cutter body there are great difficulties connected with the manufacture of the location members in the cutter body so as satisfactorily to meet the demands for high accuracy in positioning the inserts in throwaway-type finishing cutters. Another problem is to maintain required tolerances in the thickness of the inserts. If each insert is arranged to be held against a solid support surface in the cutter body (which is to be preferred for stability reasons), the position of the cutting edge in relation to the cutter body will vary according to the thickness of the insert in the use of conventional cutting angles.

It is an object of the invention to provide a simple as well as effective solution of the above, and other related, problems in manufacturing milling cutters.

According to the present invention a side edge of each cutting insert is arranged to be held against a support surface planetarily ground in the milling cutter body in a direction perpendicular to its rotational axis. At the same time, another side edge of each cutting insert may be arranged to be held against a minor edge support surface. To this end, each cutting insert is formed with clearance angles $\beta$ equal to one half that clearance angle $\alpha$ which is necessary for the function of the milling cutter, which means that after positioning each insert as set out hereinbefore there will be an angle $90° - (\alpha/2)$ between one end surface of said cutting insert and the planetarily ground support surface. In this way the accuracy in positioning the inserts in the axial direction is only dependent on (1) the accuracy by which the planetarily ground support surface has been obtained and (2) on the edge length of each insert.

Other essential features of the invention will be apparent in connection with the following detailed description, in connection with the attached drawings in which.

Figure 1:
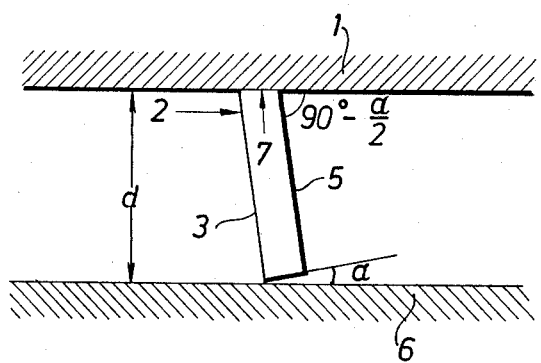
FIG. 1 shows an axial sectional view of the cutter body with a cutting insert positioned therein, with the clamping elements eliminated for convenience, embodying the principles of the invention.

Reference numeral 1 designates a body of a milling cutter with recesses intended for cutting inserts 2 and appertaining clamping means. Each insert 2 has two opposite, substantially plane, end surfaces 4 and 5 and between these faces side edges 3. The embodiment shown in FIGS. 1–5 includes inserts of square configuration. It is to be understood, however, that the present invention is useful with all cutting inserts of conventional types having two opposite, parallel, side edges. Even inserts of circular form may be useful with the present invention.

According to the invention, side edges 3 of each cutting insert 2 are formed with clearance angles $\beta$ being equal to one-half that clearance angle $\alpha$ which is necessary for the function of the milling cutter, i.e. that angle at which each cutting insert is to be placed in operative position relative to a workpiece 6. When positioning each insert in its recess in the cutter body 1, one side edge 3 is adapted to rest against a support surface 7 planetarily ground in the cutter body substantially parallel to its rotational plane, so that the angle which end face 5 presents to support surface 7 will be equal to $90° - (\alpha2)$. The said planetarily ground support surface 7 may also be slightly tapered inwardly, in which circumstance support surface 7 then forms part of a conical surface, the conical tip angle whereof should have a value between 179° and 180°.

Figure 4:
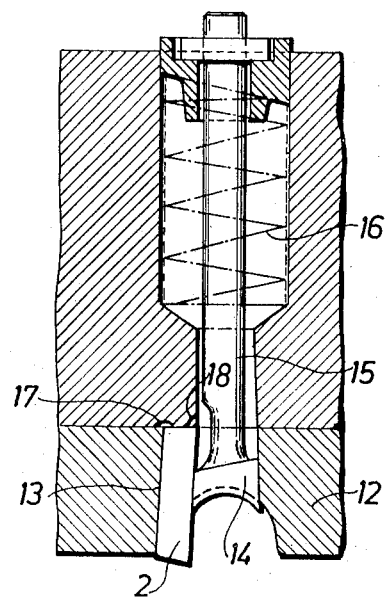
FIG. 4 shows an axial, sectional view of one embodiment for clamping the cutting inserts in place.
Figure 5:
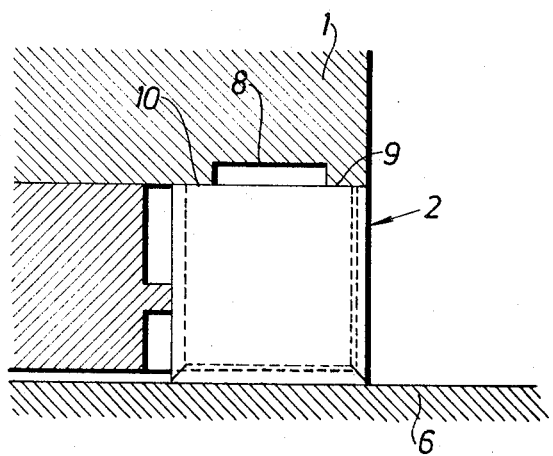
FIG. 5 shows another embodiment of the invention wherein the planetarily ground support surface in the cutter body is provided with recesses.

According to another embodiment of the present invention support surface 7 is provided with recesses 8, 17 and 18, as appears from FIGS. 4–5, so that each cutting insert in the axial direction only rests against protruding location members 9 and 10, as shown in FIG. 5.

Besides support surface 7, the cutter body 1 is provided with location members 11 intended as supports for the side edges 3 of the cutting insert arranged in a main direction other than the direction of support surface 7. Location members 11 in said main direction may be formed as small supporting surfaces or as points. It is to be understood that several location members 11 intended as edge supports may be arranged in the same main direction.

Figure 2:
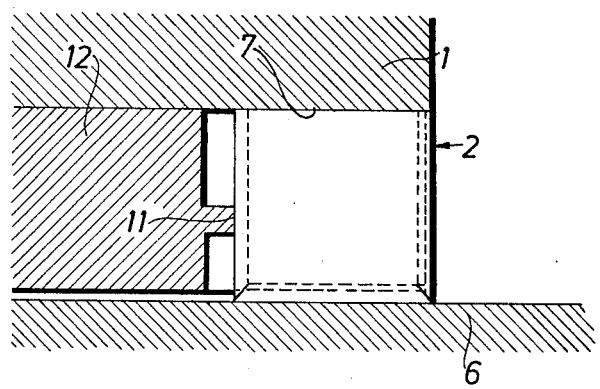
FIG. 2 shows another axial, sectional view of a milling cutter of the invention provided with a cutting insert of square configuration.
Figure 3:
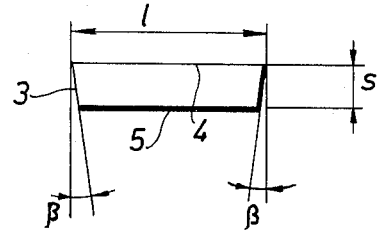
FIG. 3 shows a cutting insert of square configuration.

Referring to FIG. 2, location member 11 is formed as a small supporting surface compared to the edge surface 3 of the cutting insert. Support surface 11 may be plane, as appears from FIG. 2, or it may be of any other suitable form.

According to one preferred embodiment of the invention a support ring 12 is fastened to the cutter body by suitable means said ring forming, with a location member 11 thereon, an edge support for the cutting insert. The edge supporting surfaces 11 may also be situated on pins or equivalent supports which may be fastened to support ring 12.

Referring now to FIG. 4, cutting insert 2 is placed in its recess in the cutter body, where its side edges are intended to rest against location members 7 and 11 while one end surface thereof is intended to rest against a supporting surface 13 arranged on the support ring 12. The recesses arranged for the reception of the inserts are formed as pockets in the support ring 12, wherein suitable means — known per se — are arranged so as to bring the insert into firm contact with its supporting surfaces in a manner as hereinbefore described. In the preferred embodiment shown, the insert is held against its supporting surfaces by a spring device including a wedge-shaped device 14, a pull rod 15 being connected to, or integral with, the wedge-shaped device, and a spring 16. According to the embodiment shown, the insert 2 is held by means of spring 16, which clamps insert 2 against supporting surface 13 via pull rod 15 and wedge-shaped device 14, which device is in close contact with an end surface of the insert.

For obvious reasons, the advantages with a milling cutter as hereinbefore described are essential. Only one plane surface has to be planetarily ground in the cutter body, which implies that the axial position of the cutting edges in relation to the rotational plane of the cutter body is now only dependent on the accuracy by which the planetarily ground support surface 7 has been obtained and on the edge length 1 of each cutting insert. Another essential advantage is that the positioning of the cutting edges in the axial direction is now also independent of tolerance deviations in the pitch for the insert-receiving recesses, i.e. the position of the supporting surfaces radially as well as tangentially may vary without causing any difference as to the distance $d$, as illustrated in FIG. 1. Similarly, the dimension of the distance $d$ is now only dependent of the dimension of the edge length 1 even if the thickness $s$ of the insert should vary.

I claim:

1. A milling cutter which comprises a cutter body having a plurality of recesses spaced about the circumference thereof for removably placed cutting inserts, each cutting insert having two opposite, substantially plane, end surfaces with side edges between them, a plurality of clamping devices, each cutting insert being clamped in a recess with one end surface thereof in contact with one of said clamping devices and the other end surface in contact with a supporting surface arranged in the recess, wherein the side edges of each cutting insert are formed with clearance angles $\beta$ equal to one-half that clearance angle $\alpha$ which is necessary for the function of the milling cutter, each cutting insert being positioned with one side edge thereof resting against a support surface that is planetarily ground in the cutter body substantially parallel to its rotational plane, so that the angle which one end surface presents to said planetarily ground support surface is equal to $90° (\alpha/2)$.

2. Milling cutter according to claim 1, wherein said planetarily ground support surface is tapered inwardly so that said support surface forms part of a conical surface, the conical tip angle whereof has a value between 179° and 180°.

3. Milling cutter according to claim 1, wherein said planetarily ground support surface is provided with recesses so that each cutting insert axially only rests against protruding location members.

4. Milling cutter according to claim 1, in which the insert-receiving recesses are formed as pockets equally spaced around the periphery of a separate support ring that is fastened to the cutter body, each said cutting insert being positioned in one of said recesses with one of its side edges in contact with at least one location member and with another of its side edges in contact with said planetarily ground support surface.

* * * * *

UNITED STATES PATENT OFFICE
CERTIFICATE OF CORRECTION

Patent No. 3,786,545          Dated January 22, 1974

Inventor(s) SVEN AXEL OLOF WIRFELT

It is certified that error appears in the above-identified patent and that said Letters Patent are hereby corrected as shown below:

Claim 1, last line  "(a/2)" should be

-- $-\frac{\alpha}{2}$ --

Signed and sealed this 23rd day of April 1974.

(SEAL)
Attest:

EDWARD M. FLETCHER, JR.          C. MARSHALL DANN
Attesting Officer                Commissioner of Patents